United States Patent
Abernethy, Jr. et al.

(10) Patent No.: US 10,343,062 B2
(45) Date of Patent: *Jul. 9, 2019

(54) DYNAMIC UPDATE OF CONTACT INFORMATION AND SPEED DIAL SETTINGS BASED ON A VIRTUAL WORLD INTERACTION

(71) Applicant: International Business Machines Corporation, Armonk, NY (US)

(72) Inventors: Michael N. Abernethy, Jr., Pflugerville, TX (US); Travis M. Grigsby, Seattle, WA (US); Daniel E. Morris, Murphy, TX (US); Nazgol Sedghi, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 918 days.

This patent is subject to a terminal disclaimer.

(21) Appl. No.: 14/931,771

(22) Filed: Nov. 3, 2015

(65) Prior Publication Data
US 2016/0051893 A1 Feb. 25, 2016

Related U.S. Application Data

(63) Continuation of application No. 11/928,450, filed on Oct. 30, 2007, now Pat. No. 9,180,372.

(51) Int. Cl.
*A63F 13/31* (2014.01)
*A63F 13/335* (2014.01)
(Continued)

(52) U.S. Cl.
CPC ............ *A63F 13/31* (2014.09); *A63F 13/12* (2013.01); *A63F 13/332* (2014.09);
(Continued)

(58) Field of Classification Search
CPC ...................................................... A63F 13/31
See application file for complete search history.

(56) References Cited

U.S. PATENT DOCUMENTS

| 7,036,082 B1 | 4/2006 | Dalrymple et al. |
| 2001/0046228 A1 | 11/2001 | Tahtinen et al. |

(Continued)

OTHER PUBLICATIONS

"Titan Panel," WoWWiki, Oct. 26, 2007, 15 pages. http://www.wowwiki.com/index.php?title=Titan_Panel&oldid=941976.

(Continued)

*Primary Examiner* — Justin S Lee
(74) *Attorney, Agent, or Firm* — Yee & Associates, P.C.; Robert Shatto (57) ABSTRACT

Updating contact information for a first communication device according to metadata associated with a virtual world is provided. In response to an avatar of a first user interacting with an avatar of a second user in the virtual world, information comprising a name of the avatar of the second user and metadata associated with the avatar of the second user is sent to the first user. In response to receiving the information, contact information associated with the name of the avatar of the second user is determined. The contact information is organized based on the metadata. The organized contact information is prioritized according to the metadata. A speed dial setting corresponding to the prioritized contact information is assigned. The assigned speed dial setting is assigned to the first communication device. The assigned speed dial setting is stored in the first communication device.

20 Claims, 4 Drawing Sheets

(51) Int. Cl.

| | | |
|---|---|---|
| *A63F 13/332* | (2014.01) | |
| *A63F 13/30* | (2014.01) | |
| *H04M 1/2745* | (2006.01) | |
| *H04N 19/20* | (2014.01) | |
| *A63F 13/795* | (2014.01) | |
| *A63F 13/825* | (2014.01) | |
| *A63F 13/87* | (2014.01) | |
| *H04L 29/06* | (2006.01) | |
| *H04M 1/725* | (2006.01) | |

(52) U.S. Cl.
CPC .......... *A63F 13/335* (2014.09); *A63F 13/795* (2014.09); *A63F 13/825* (2014.09); *A63F 13/87* (2014.09); *H04M 1/274508* (2013.01); *H04M 1/274516* (2013.01); *H04M 1/274533* (2013.01); *H04N 19/20* (2014.11); *A63F 2300/406* (2013.01); *A63F 2300/5553* (2013.01); *A63F 2300/572* (2013.01); *H04L 67/38* (2013.01); *H04M 1/72544* (2013.01)

(56) References Cited

U.S. PATENT DOCUMENTS

| | | | |
|---|---|---|---|
| 2004/0128350 A1* | 7/2004 | Topfl | G06Q 10/10 709/204 |
| 2006/0079325 A1* | 4/2006 | Trajkovic | A63F 13/12 463/31 |
| 2007/0099671 A1* | 5/2007 | Gruchala | H04M 3/42272 455/564 |
| 2009/0113313 A1 | 4/2009 | Abernethy et al. | |
| 2009/0113319 A1* | 4/2009 | Dawson | H04L 63/102 715/762 |

OTHER PUBLICATIONS

Augustino, "Regulating VoIP," Game Developer, May 2007, p. 56.
Enuha, "Clear my Tracks: yes please!!!!," Microsoft Corporation, Jan. 12, 2006, 2 pages. http://blogs.msdn.com/b/ie/archive/2006/01/12/clear-my-tracks-yes-please.aspx.
Johnson, "New! Features: Microsoft Office Outlook 2003," In: Show Me Microsoft Office Outlook 2003, Que Publishing, Sep. 19, 2003, 8 pages. http://academic.safaribooksonline.com/book/office-and-productivity-applications/0789730081/new-features/art02lev2sec1.
Mills et al., "Situated Computing: The Next Frontier for HCI Research", National Institute of Standards and Technology, 2002, 25 pages. http://w3.antd.nist.gov/pubs/situated%20 computing(8).pdf.
Ogi et al., "Communication between Outdoor Field and Immersive Virtual Environment", Proceedings of the 20th International Conference on Advanced Information Networking and applications (AINA'06), Apr. 2006, 5 pages.
Walsh, "Connecting Real Voices Though Virtual Worlds", Apr. 11, 2006, 18 pages. http://www.secretlair.com/index.php?/clickableculture/entry/connecting_real_voices_through_virtual_worlds/.
White, "Chapter 1: Welcome to Second Life" and "Chapter 3: Communication and Social Networking," In: Second Life: A Guide to Your Virtual World, Que Publishing, Aug. 21, 2007, 66 pages. http://academic.safaribooksonline.com/book/web-applications-and-services/9780321501660.
Office Action, dated Jan. 5, 2011, regarding U.S. Appl. No. 11/928,450, 17 pages.
Final Office Action, dated Jun. 23, 2011, regarding U.S. Appl. No. 11/928,450, 18 pages.
Notice of Allowance, dated Jul. 1, 2015, regarding U.S. Appl. No. 11/928,450, 12 pages.

\* cited by examiner

DYNAMIC UPDATE OF CONTACT INFORMATION AND SPEED DIAL SETTINGS BASED ON A VIRTUAL WORLD INTERACTION

This application is a continuation of prior application Ser. No. 11/928,450, filed Oct. 30, 2007.

BACKGROUND

1. Field

The present invention relates generally to data processing systems. More specifically, the present invention provides a method, computer program code, and a system for managing contact information.

2. Description of the Related Art

Interactive online digital entertainment has gained ground on many fronts in recent years, especially with respect to video gaming. For example, users can login to certain websites to play a game in a virtual world. People who play games in virtual worlds often multitask. Meaning, as they play the game, they are watching television, talking on the phone, listening to music, etc. Additionally, as a human player will be interacting with one or more other human players, the players may desire to communicate with each other to facilitate game play and interaction. Players in a virtual world often times wish to communicate with other players in the real world. This can occur to discuss secret agreements, or just because it is more convenient and accessible than communicating through the virtual world itself.

In order to make their multitasking and communication more efficient, the virtual worlds in which they play should be able to communicate with these real life devices they are using concurrently to the virtual world. Currently, no solutions exist that coordinate real world contact information with virtual world avatars.

SUMMARY

According to one illustrative embodiment, a computer program product for updating contact information for a first communication device according to metadata associated with a virtual world is provided. The first communication device is a first real communication device. In response to an avatar of a first user interacting with an avatar of a second user in the virtual world, information comprising a name of the avatar of the second user and metadata associated with the avatar of the second user is sent to the first user. In response to receiving the information, contact information associated with the name of the avatar of the second user is determined. The contact information comprises contact information for contacting a second communication device associated with the second user. The second communication device is a second real communication device. The contact information is organized based on the metadata. The organized contact information is prioritized according to the metadata. The prioritized contact information is stored. A speed dial setting corresponding to the prioritized contact information is assigned. The assigned speed dial setting is assigned to the first communication device. The assigned speed dial setting is stored in the first communication device. The first communication device is different than a first computer used to present the virtual world to the first user. The second communication device is different than a second computer used to present the virtual world to the second user. According to another illustrative embodiment, a data processing system for updating contact information for a first communication device according to metadata associated with a virtual world is provided.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION

Figure 1:
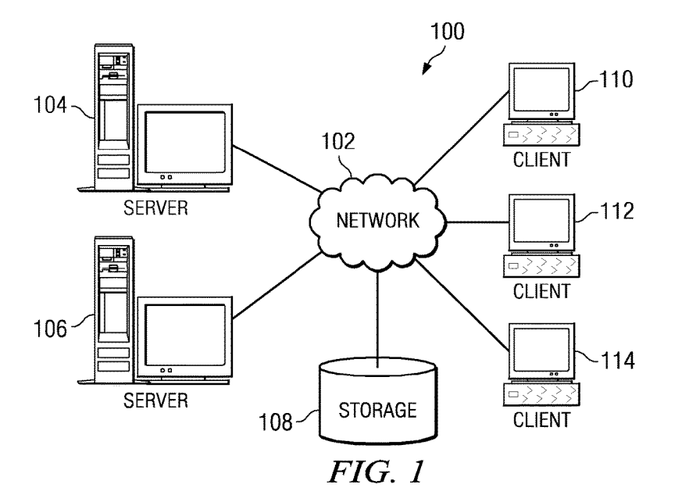
FIG. 1 is a pictorial representation of a network of data processing systems in which illustrative embodiments may be implemented.
Figure 2:
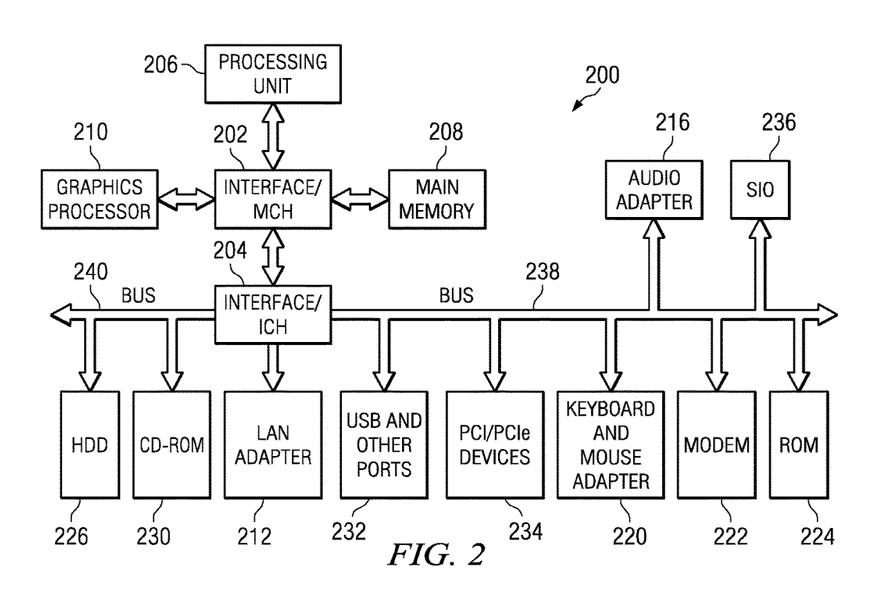
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments.

In the depicted example, data processing system 200 employs a hub architecture including interface and memory controller hub (interface/MCH) 202 and interface and input/output (I/O) controller hub (interface/ICH) 204. Processing unit 206, main memory 208, and graphics processor 210 are coupled to interface and memory controller hub 202. Processing unit 206 may contain one or more processors and even may be implemented using one or more heterogeneous processor systems. Graphics processor 210 may be coupled to the interface/MCH through an accelerated graphics port (AGP), for example.

In the depicted example, local area network (LAN) adapter 212 is coupled to interface and I/O controller hub 204 and audio adapter 216, keyboard and mouse adapter 220, modem 222, read only memory (ROM) 224, universal serial bus (USB) and other ports 232, and PCI/PCIe devices 234 are coupled to interface and I/O controller hub 204 through bus 238, and hard disk drive (HDD) 226 and CD-ROM 230 are coupled to interface and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to interface and I/O controller hub 204.

An operating system runs on processing unit 206 and coordinates and provides control of various components within data processing system 200 in FIG. 2. The operating system may be a commercially available operating system such as Microsoft® Windows Vista™ (Microsoft and Windows Vista are trademarks of Microsoft Corporation in the United States, other countries, or both). An object oriented programming system, such as the Java™ programming system, may run in conjunction with the operating system and provides calls to the operating system from Java™ programs or applications executing on data processing system 200. Java™ and all Java™-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course, the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in interface and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
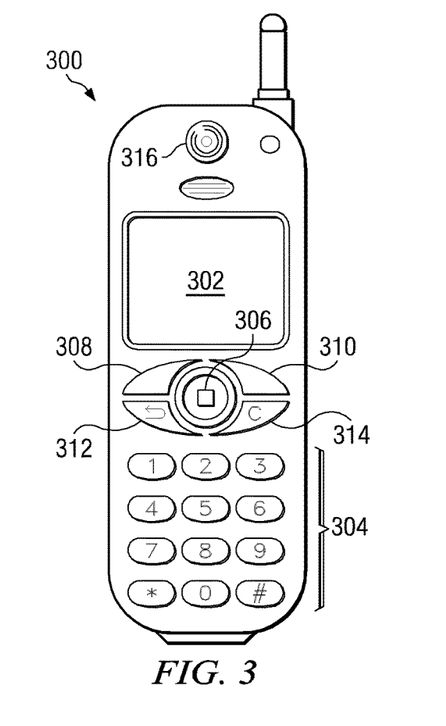
FIG. 3 depicts a mobile telephone in which illustrative embodiments may be implemented.

FIG. 3 is a mobile telephone in which illustrative embodiments may be implemented. Mobile phone 300 includes screen 302, which is capable of displaying pictures and text. Additionally, mobile phone 300 also includes numeric keypad 304, joystick 306, and buttons 308, 310, 312, and 314 placed around the joystick 306. These buttons are used to initiate various functions in mobile phone 300. These functions include, for example, activating a menu, displaying a calendar or task list, or initiating a call. Mobile phone 300 can also include camera 316, which may be used to take pictures or videos depending upon the implementation.

In addition, mobile phone 300 includes a global positioning system receiver for determining a position of mobile phone 300 on the Earth's surface by comparing data received from various satellites by the global positioning system receiver.

Figure 4:
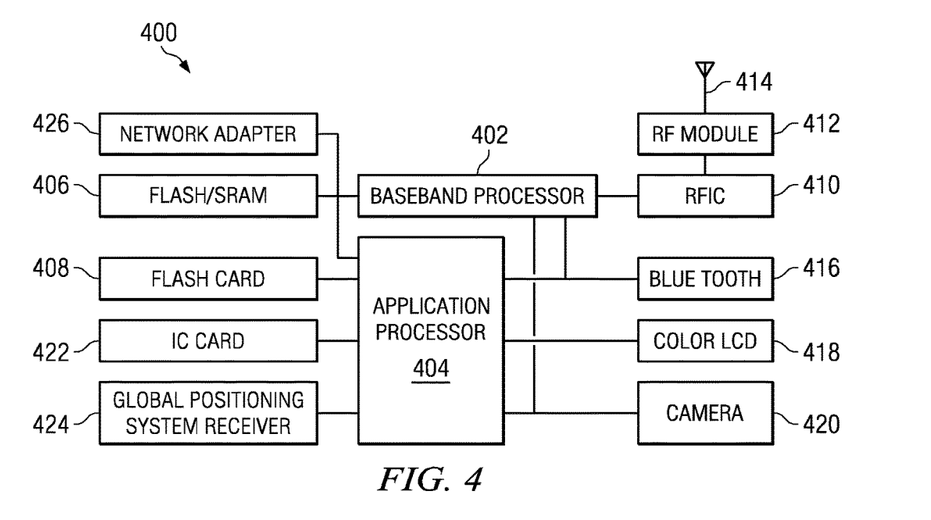
FIG. 4 is a block diagram of a camera phone in which illustrative embodiments may be implemented.

With reference now to FIG. 4, a block diagram of a camera phone is depicted in which illustrative embodiments may be implemented. Camera phone 400 includes baseband processor 402, application processor 404, flash/static random access memory (SRAM) 406, flash card 408, radio frequency integrated circuit (RFIC) 410, radio frequency (RF) module 412, antenna 414, Blue Tooth unit 416, color liquid crystal display (LCD) 418, camera 420, IC card 422, global positioning system receiver 424, and network adapter 426.

Baseband processor 402 provides for receiver and transmitter operations and is also referred to as a transceiver. In particular, baseband processor 402 handles all audio, signal, and data processing needed to receive and send data using RF transmissions or Blue Tooth transmissions. Application processor 404 provides the processing power for other functions within camera phone 400. For example, calculators, calendars, alarms, camera functions, and directories are provided through application processor 404. Flash/SRAM 406 is a storage device in which various instructions for providing the functions within camera phone 400 are located and provide upgrades. Flash card 408 is a storage device in which user data and applications may be stored. An example of flash card 408 is a secure digital card.

A pathway for the transmission of voice and other types of data is through RFIC 410. Additionally, short-range transmissions may be sent or received through Blue Tooth unit 416. Blue Tooth unit 416 conforms to Blue Tooth wireless specification, which defines the link layer and the application layer for product developers. Both of these transmissions are made through antenna 414 in this illustrative example.

Color LCD 418 provides a display for pictures and other data for camera phone 400. Camera 420, in this example, is a complementary metal oxide semiconductor (CMOS) camera that may be built into camera phone 400 or connected to camera phone 400 as a module, such as IC card 422. IC card 422 also may contain other application specific functions, such as a modem or additional memory.

Global positioning system receiver 424 receives data from various satellites. Global positioning system receiver 424 determines the latitude and longitude of global positioning system receiver 424 by calculating the time taken for each satellite signal to reach global positioning system receiver 424. Based on the difference in time of reception for signals received from different satellites, global positioning system receiver 424 is able to determine the position of global positioning system receiver 424.

Network adapter 426 is a network adapter for accessing a wireless network. In one embodiment, network adapter 426 utilizes wireless application protocols to enable camera phone 400 to access wireless networks.

Illustrative embodiments create a system and method for a virtual world to communicate with a data processing system to update contact information according to metadata associated with the virtual world. In an alternative embodiment, a virtual world communicates with a cell phone to update the contact information in the cell phone and to create and organize speed dial settings to reflect the user's current situation in the virtual world. Contact information may include, but is not limited to, cell phone number, instant messaging identities, e-mail addresses, and VOIP information. VOIP means "Voice over IP." VOIP is a way of utilizing the Internet, or, in some cases, intranets, for telephone conversations.

Thus, when a first user's character, known as an avatar, is interacting with the avatar of a second, or possibly more user(s) in the virtual world, the contact information of the second user is updated and used to create a speed dial setting for the second user, which is organized or prioritized according to metadata from the virtual world, for the first user. The contact information of the second user and a speed dial setting for the second user is updated by placing the second user's avatar name from the virtual world in the contact information and creating a speed dial setting for the second user's avatar name. The speed dial setting may be organized based on letters, such as the first letter of the avatar's name, or based on metadata from the virtual world, or a combination thereof.

Virtual world metadata comprises, but is not limited to, player rankings, which may be based on various criteria, group affiliation, such as guild membership or party membership, physical proximity of the avatars, most recently interacted with avatars, and most frequently interacted with avatars. Player ranking may be based on many criteria. In the simplest form, the avatar with the most experience points, or highest level, would be speed dial setting 2, the 2nd most points would be speed dial 3, and so forth. Conversely, player ranking could be judged on a particular subset of game statistics, such as a player versus player rating, a number of particular enemies killed, a dueling rating, an arena rating, and so forth.

Speed dial settings may be organized according to group affiliations. That is, various groups of speed dial settings could be created and saved according to various virtual world group memberships. Thus, there may be a group of contact information settings that are grouped and organized according to membership in a current party. Additionally, another set of contact information and speed dial settings may be saved and organized according to a user's membership in the guild, where the speed dial settings are organized according to a ranking within the guild. In another embodiment, a set of contact information and speed dial settings may be saved and organized according to a user's list of "friends" in the virtual world.

Conversely, when the user's avatar is done meeting the characters in the virtual world, or logs out of the virtual world environment, the contact information & speed dial settings may be returned to normal, as the user may be less likely to contact the other users via cell phone when not interacting in the virtual world environment.

By tying the virtual world avatar to the players' cell phone contact information, other contact information, and speed dial settings, communication becomes more efficient and easy for the players. This is especially important in virtual worlds, as time is important, making communication with speed is important, and also because player's hands are often busy in the game, meaning they do not have the ability to cycle through many contacts.

Additionally, players often times do not know each other in the real world, and only interact with each other in the virtual world. Thus, adding them as a speed dial contact during the game, and removing them when not in the game, is advantageous and helps the player separate their real world friends from their virtual world friends.

Illustrative embodiments create a means of communicating between the virtual world and a cell phone of a user. The virtual world would determine who the user's avatar is interacting with in the virtual world, such as though 1:1 interaction, or in a small meeting with, or even in a similar large group, such a guild. The virtual world would then send the communication information for users of these other avatars to the user's cell phone, along with the speed dial information that the user's phone should use to organize the information in their speed dial. There are two possible solutions for placing speed dial contacts in the speed dial settings.

In one solution, the letters on the phone that correspond to the name of the avatar are used as the corresponding speed dial settings. Thus, using an example, if the user's avatar is interacting in a virtual world with avatars named "Helmuk", "Saljuk" and "Yooza", the virtual world would send the following information to the user's cell phone:

H=Helmuk=312.555.2343
S=Saljuk=034.2323.232.32
Y=Yooza=019.23.2332

The user would then be able to press the "H" button on their cell phone and the cell phone would automatically call the phone number for Helmuk's user. Once a user has left the virtual world environment, the virtual world would send a message to remove all the speed dial settings that the virtual world had caused to be created. Thus, if a user pressed "H" after leaving the virtual world environment, the user would instead call "Havana Subs".

In another illustrative embodiment, the speed dial settings are based on metadata associated with the virtual world environment. One common type of metadata is experience points or player rankings. In this way, the speed dial settings are assigned to avatars, based on the metadata.

Figure 5:
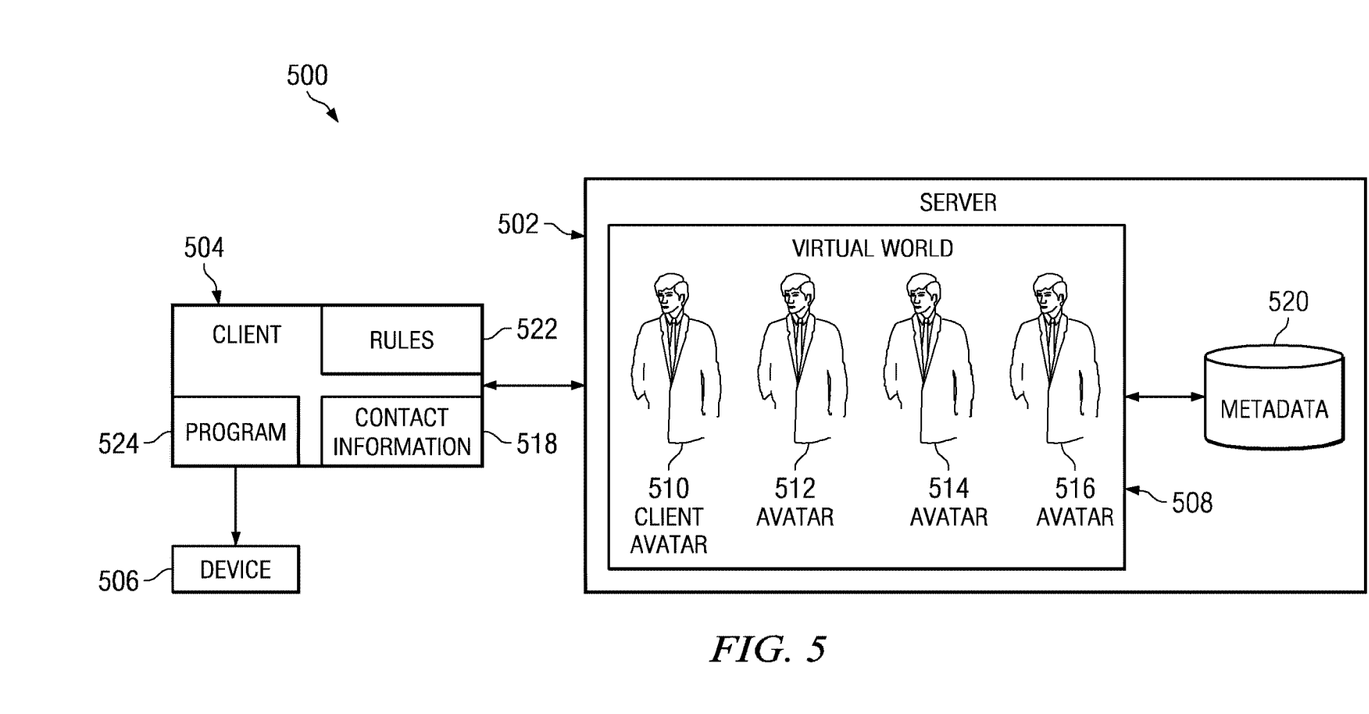
FIG. 5 is a block diagram of a system for updating contact information according to metadata associated with a virtual world in accordance with an illustrative embodiment.

FIG. 5 is a block diagram of a system for updating contact information according to metadata associated with a virtual world in accordance with an illustrative embodiment. System 500 comprises server 502, client 504 and device 506. Server 502 and client 504 are data processing systems, which may be implemented as data processing system 200 in FIG. 2. Server 502 and client 504 comprise a network, such as network 102 in FIG. 1.

Virtual world 508 runs on server 502. Various users log into virtual world 508 from remote clients, such as client 504. Each user that logs into virtual world 508 has an associated avatar. Client avatar 510 is the avatar associated with client 504. Avatars 512, 514, and 516 represent either other users in virtual world 508 or non-player characters in virtual world 508. Metadata for virtual world 508 that is associated with each avatar is stored in a database, such as metadata 520 database.

Client 504 contains contact information 518, rules 522, and program 524. Contact information 518 includes phone numbers, real names, possible e-mail addresses, and other forms of contact information, such as, for example, but not limited to, instant messenger identities, e-mail addresses, and so forth. Contact information 518 associates a real world user with their virtual world avatar name. Rules 522 define how to organize contact information 518 in relation to received metadata information from metadata 520. Program 524 is a computer program product comprising computer-usable code, which makes use of contact information 518. For example, program 524 may be an instant messaging program or a VOIP client program.

Thus, when client avatar 510 in virtual world 508 interacts with another avatar in virtual world 508, such as avatar 512, virtual world 508 sends avatar 512's name and metadata for avatar 512 to client 504. Client 504 receives the transmitted information. The received avatar name is used to look up contact information in contact information 518. Rules 522 then determines, based on the received metadata, how to organize the contact information. That is, rules 522 is used to prioritize the contact information based on the metadata and to determine what speed dial setting the contact information is assigned to and if the contact information and speed dial setting should be assigned as part of a specific group.

Once these determinations are made, client 504 transmits the information to device 506. Device 506 then stores the contact information and speed dial setting. In an illustrative embodiment, device 506 is a mobile phone, such as mobile phone 300 in FIG. 3. However, device 506 may be any appropriate communications device, such as a PDA, for example. Client 504 communicates with device 506 via any appropriate communications means, such as, but not limited to, a Bluetooth connection, wireless connection, a USB connection, a LAN line, and so forth.

The transfer of information from virtual world 508 to client 504 may be triggered based on a number of conditions. For example, client avatar 510 touching another avatar could trigger the transfer of information. Client avatar 510 talking to another avatar, via private communication, a group communication, or a public communication may trigger the transfer. Further, the type of communication between the avatars could indicate a grouping for the information. For example, if client avatar 510 communicates with another avatar through a guild chat channel, then the information for the avatar may be saved in a group designated for members of that guild. Further, associated groupings may be created. For example, if a user's avatar communicates with an avatar belonging to another group or guild, a specific group could be created for the group that the other avatar belongs to. Thus, a user could end up with several groups of contact information and speed dial settings that correspond to various social groups in the virtual world.

For example, a user could have groups created for the party the avatar is currently in, a group for the guild the avatar belongs to, groups for each guild that each party member belongs to, and a default group for all other avatars that the user's avatar interacts with. Furthermore, the speed dial settings within these various groups can each be prioritized based on different criteria. For example, the default group may be prioritized according to the experience of the avatar, the most frequently communicated with avatar, or the most recently communicated avatar. Yet the group for the party that the avatar is currently in may be organized simply by avatar name, while the group for the guild that the avatar belongs to may be prioritized by an avatar's rank within the guild.

Furthermore, the transfer of information could be triggered by proximity of avatars. So if client avatar 510 is within a certain distance from another avatar, then the information regarding that is sent by virtual world 508 to client 504.

In another exemplary embodiment, once rules 522 is used to prioritize the contact information based on the metadata, client 504 transfers the information to program 524 as well as transmitting the information to device 506. Program 524 then updates and organizes contact information in program 524 to include the received information. Thus, instant messaging contact information, VOIP settings and contact information may be prioritized and organized based on the metadata.

Figure 6:
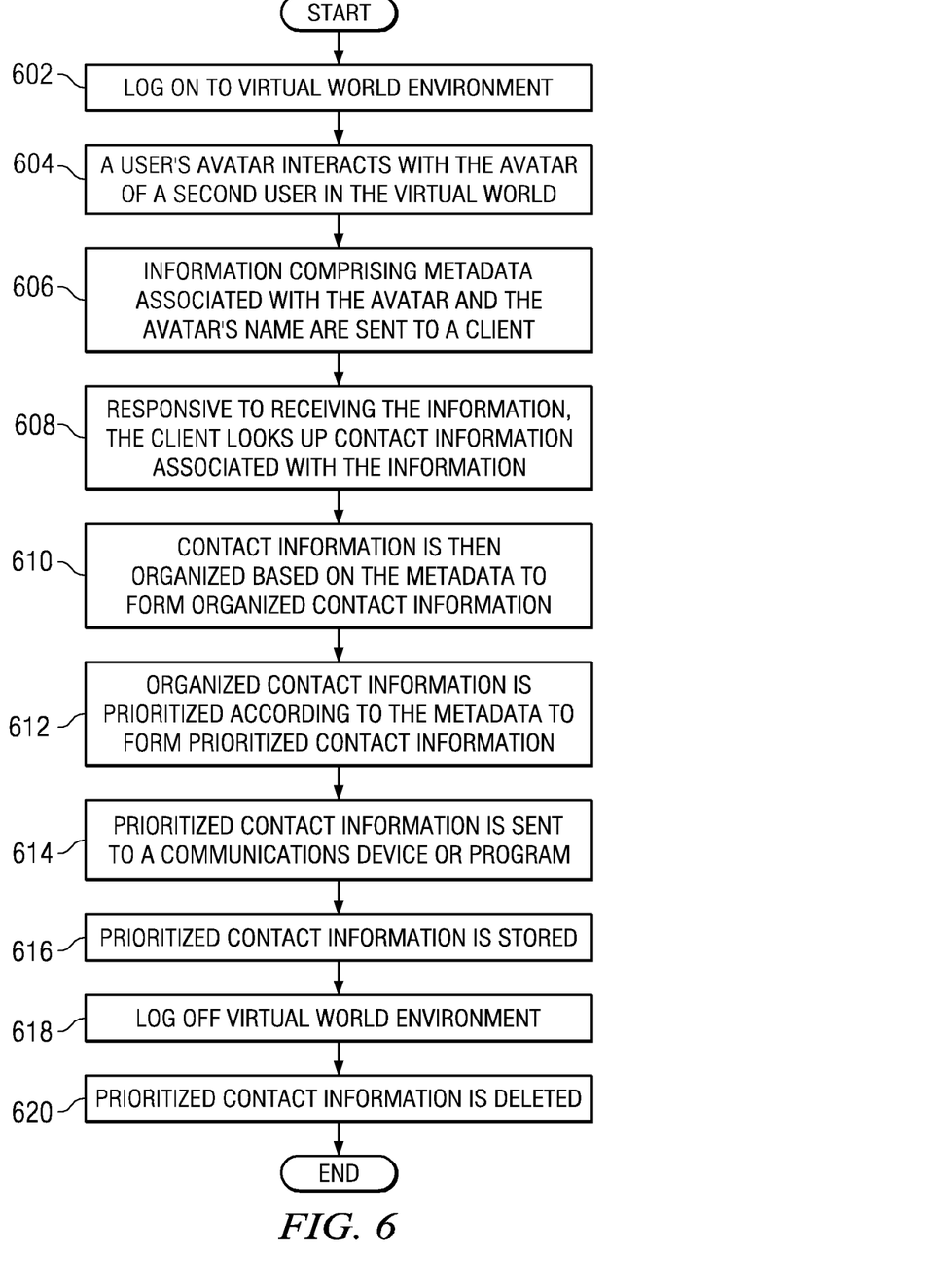
FIG. 6 is a flowchart illustrating the operation of updating contact information according to metadata associated with a virtual world in accordance with an illustrative embodiment.

FIG. 6 is a flowchart illustrating the operation of updating contact information according to metadata associated with a virtual world in accordance with an illustrative embodiment. Steps 602 to 606 and 618 may be performed by a virtual world, such as virtual world 508 of FIG. 5. Steps 608 to 614 are performed by a client data processing system, such as client data processing system 504 in FIG. 5. Steps 616 and 620 are performed by a communications device, such as mobile phone 300 in FIG. 3 or a program, such as program 524 in FIG. 5. The operation begins when a user logs onto a virtual world environment (step 602). The user's avatar interacts with an avatar of a second user in the virtual world (step 604). Information comprising metadata associated with the avatar and the avatar's name of the second user are sent to the first user (step 606). Responsive to receiving the information, contact information associated with the information is determined (step 608). The contact information is then organized based on the metadata to form organized contact information (step 610). The organized contact information is prioritized according to the metadata to form prioritized contact information (step 612). The prioritized contact information is sent to a communications device or program (step 614). A communications device may be for example, a mobile phone, such as mobile phone 300 in FIG. 3. Examples of a communications program include, but are not limited to, an instant messaging program or a voice over internet protocol program. The prioritized contact information is stored (step 616). The user logs off the virtual world environment (step 618). The prioritized contact information is deleted (step 620) and the operation ends. This process is repeated every time the user's avatar interacts with another avatar. In an alternate embodiment, speed dial settings are also determined for the contact information.

Furthermore, in alternate embodiment, once the user disconnects from the virtual world (step 618), the prioritized contact information is de-prioritized rather than erased. Additionally, the contact information may be de-prioritized or deleted after a set amount of time has passed.

Thus, illustrative embodiments allow users in a virtual world to communicate with other users in the real world by providing a means of communicating between the virtual world and a cell phone of a user. The virtual world would determine who the user's avatar is interacting with in the virtual world, such as though 1:1 interaction, or in a small meeting with, or even in a similar large group, such a guild. The virtual world would then send the communication information for users of these other avatars to the user's cell phone, along with the speed dial information that the user's phone should use to organize the information in their speed dial.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can store the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product for updating contact information for a first communication device according to metadata associated with a virtual world, wherein the first communication device is a first real communication device, the computer program product comprising a non-transitory computer readable storage medium having program instructions embodied therewith, the program instructions comprising:

program instructions, responsive to an avatar of a first user interacting with an avatar of a second user in the virtual world, for sending information comprising a name of the avatar of the second user and metadata associated with the avatar of the second user to the first user;

program instructions, responsive to receiving the information, for determining contact information associated with the name of the avatar of the second user, wherein the contact information comprises contact information for contacting a second communication device associated with the second user, wherein the second communication device is a second real communication device;

program instructions for organizing the contact information based on the metadata to form organized contact information;

program instructions for prioritizing the organized contact information according to the metadata to form prioritized contact information;

program instructions for storing the prioritized contact information;

program instructions for assigning a speed dial setting corresponding to the prioritized contact information to form an assigned speed dial setting, wherein the assigned speed dial setting is assigned to the first communication device; and program instructions for storing the assigned speed dial setting in the first communication device, wherein the first communication device is different than a first computer used to present the virtual world to the first user, and wherein the second communication device is different than a second computer used to present the virtual world to the second user.

2. The computer program product of claim 1, further comprising:

program instructions for assigning speed dial settings corresponding to the prioritized contact information to form assigned speed dial settings; and program instructions for storing the assigned speed dial settings.

3. The computer program product of claim 1, further comprising:

program instructions for sending the prioritized contact information to a communication device.

4. The computer program product of claim 1, further comprising:

program instructions for sending the prioritized contact information to a communication program.

5. The computer program product of claim 4, wherein the communication program is an instant messaging program.

6. The computer program product of claim 4, wherein the communication program is a voice over internet protocol (VOIP) program.

7. The computer program product of claim 1, wherein the program instructions for organizing the contact information based on the metadata to form organized contact information further comprises:
   program instructions for organizing the contact information based on metadata representing a social affiliation in the virtual world.

8. The computer program product of claim 7, wherein the social affiliation in the virtual world is a party.

9. The computer program product of claim 7, wherein the social affiliation in the virtual world is a friends list.

10. The computer program product of claim 7, wherein the social affiliation in the virtual world is a guild.

11. A data processing system for updating contact information for a first communication device according to metadata associated with a virtual world, wherein the first communication device is a first real communication device, the data processing system comprising:
   a bus system;
   a storage device connected to the bus system, wherein the storage device stores program instructions; and
   a processor connected to the bus system, wherein the processor executes the program instructions to:
   send information comprising a name of an avatar of a second user and metadata associated with the avatar of the second user to a first user in response to an avatar of the first user interacting with the avatar of the second user in the virtual world;
   determine contact information associated with the name of the avatar of the second user in response to receiving the information, wherein the contact information comprises contact information for contacting a second communication device associated with the second user, wherein the second communication device is a second real communication device;
   organize the contact information based on the metadata to form organized contact information;
   prioritize the organized contact information according to the metadata to form prioritized contact information;
   store the prioritized contact information;
   assign a speed dial setting corresponding to the prioritized contact information to form an assigned speed dial setting, wherein the assigned speed dial setting is assigned to the first communication device; and
   store the assigned speed dial setting in the first communication device, wherein the first communication device is different than a first computer used to present the virtual world to the first user, and wherein the second communication device is different than a second computer used to present the virtual world to the second user.

12. The data processing system of claim 11, wherein the processor further executes the program instructions to:
   assign speed dial settings corresponding to the prioritized contact information to form assigned speed dial settings; and
   store the assigned speed dial settings.

13. The data processing system of claim 11, wherein the processor further executes the program instructions to:
   send the prioritized contact information to a communication device.

14. The data processing system of claim 11, wherein the processor further executes the program instructions to:
   send the prioritized contact information to a communication program.

15. The data processing system of claim 14, wherein the communication program is an instant messaging program.

16. The data processing system of claim 14, wherein the communication program is a voice over internet protocol (VOIP) program.

17. The data processing system of claim 11, wherein organizing the contact information based on the metadata to form organized contact information comprises the processor further executing the program instructions to:
   organize the contact information based on metadata representing a social affiliation in the virtual world.

18. The data processing system of claim 17, wherein the social affiliation in the virtual world is a party.

19. The data processing system of claim 17, wherein the social affiliation in the virtual world is a friends list.

20. The data processing system of claim 17, wherein the social affiliation in the virtual world is a guild.

* * * * *